UNITED STATES PATENT OFFICE.

JAMES WALLACE BEVERIDGE, OF NEW YORK, N. Y., ASSIGNOR OF ONE-FOURTH TO ADOLPH ALEXANDER THOMAS, OF NEW YORK, N. Y.

MEANS FOR AND METHOD OF STABILIZING SECRETIN.

1,181,424. Specification of Letters Patent. Patented May 2, 1916.

No Drawing. Application filed May 6, 1914. Serial No. 836,643.

*To all whom it may concern:*

Be it known that I, JAMES WALLACE BEVERIDGE, a citizen of the United States, and a resident of New York, in the county of New York and State of New York, have invented certain new and useful Improvements in Means for and Methods of Stabilizing Secretin, of which the following is a specification.

My invention relates generally to therapeutic compounds and has for its object the provision of means and methods whereby the substance known as secretin is rendered stable as a commercial product, and capable of producing a human physiological action when administered orally.

The name "secretin" has been arbitrarily given to a substance found to exist in the epithelial cells of the intestinal mucosa. As far as our present knowledge of secretin goes, this substance may be defined as a protein which is classed in the Hormone group as a cell-activator having a distinct selective action on the secretory function of the pancreas, and that particular and distinctive function is, as far as we know, possessed by secretin alone. Secretin is not a ferment. Of the chemical nature or composition of secretin nothing is known, but it has been distinctly proved by laboratory experiments that secretin, when absorbed into the blood current, stimulates or activates the pancreas and also increases intestinal peristalsis. It is well known that in digestion one of the principal organs or glands is the pancreas which has certain distinct functions in the breaking down of the protein and carbohydrate group, also in the changing of the fat molecule, through its secretions which enter into the intestinal tract through the duct of Wirsung. However, secretin has heretofore been left to the physiologists in their field of experimentation, and this is due to the fact that it is a most unstable chemical compound which loses its activity in from six to twenty-four hours after extraction from the epithelial cells of the intestinal mucosa. The reason ascribed to this rapid loss of activity of secretin is the active combining of secretin with the oxygen in the air, thereby forming an inert agent as far as the pancreas is concerned. Also, sun-light causes a degeneration of the stimulating or activating power of secretin on the pancreas.

Now, to render secretin available for commercial use with a true therapeutic value, it is evident that it must not only be of such chemical purity as will render it adaptable to the human system, but also its activity must be maintained for a considerable period after preparation.

In the methods heretofore employed in the extraction or liberation of secretin from the epithelial cells of the intestinal mucosa of lower animals, the cells containing the secretin were boiled in an acid solution and while boiling the mixture was made alkaline by the addition of strong caustic soda, then made slightly acid by acetic acid. This was the procedure followed by Bayliss and Starling, as described by them in their article entitled "The mechanism of pancreatic secretion", in the *Journal of Physiology*, vol. 28, pages 325–353 (issue of September 12, 1902). However, secretin prepared in that way was neither stable nor of such chemical purity as would render the same adaptable to the human system for therapeutic use.

In my experiments to obtain a stable, active and chemically pure secretin, I discovered that the stability and activity of the active principle (*i. e.* secretin) of the duodenal epithelial cells are seriously impaired and practically destroyed by boiling the cells in the acid solution. I have further discovered that the addition of blood serum or similar medium, as hereinafter specified, to the solution of secretin prepared according to my method, adds to the potency of the solution and insures its stability.

I will now describe in detail a preferred manner of carrying out the process of my invention as I have actually employed it.

For the source of secretin I preferably use that part of the alimentary tract of any lower animal—such as a hog or sheep—including the gastric pyloris, the pyloris, the duodenum and the jejunum. This part is split open and washed with a normal saline solution to clean the mucosa or mucous membrane of any detritus which may be present. The mucosa with the epithelial cells is then removed or separated from the muscular wall by scraping with a blunt knife or in any other suitable way. The scrapings or cuttings, which contain the secretin, are then macerated or broken up. This may be done with mortar and pestle, or larger machinery may be used when preparing the secretin in large quantities.

The macerated mass is placed in a suitable vessel and subjected to the action of an acid solution until digested. The time for digestion of the mass will, of course, depend upon the strength and temperature of the acid solution employed. The stronger the solution and the higher the temperature, the shorter the time necessary for complete digestion. This period may vary from several minutes to several hours, as will be well understood by those skilled in the art. In my experiments I found that the best results were obtained with a hydrochloric acid solution of one-tenth to five-tenths of one per cent. in strength, although as high as eight-tenths per cent. might be used. The mixture is brought to a temperature of approximately 210° F., and it may even for a few moments exceed that temperature, but it should be kept below the boiling point, for excessive heat injures or breaks down the secretin molecule and impairs or destroys its activity. Although I prefer to use hydrochloric acid, I would have it understood that other acids—both organic or inorganic—may be employed, provided that the percentage of acidity is regulated to prevent a chemical change in the secretin, and further provided, of course, that the acid has no injurious effect on the human system. The selection of a suitable acid is within the skill of the physician.

After the mass has been digested in the heated solution, the decoction is decanted, and after being allowed to cool is passed through a suitable filter until the filtrate is clear. I found that by filtering the decoction from four to six times through a carbon filter, I obtained a clear colorless filtrate. This is a solution of secretin and the acid which was used, and the clearness of the solution shows that it is practically free from albumoses, gelatin and other impurities (such as cell-tissues, etc.) present in the raw material under treatment.

To the solution of pure and active secretin prepared as above explained, there is added a suitable quantity of blood serum—say, from one-fifth to two per cent. or any equivalent medium—such as an albumin solution or a peptone solution—which will aid and sustain the activating power of secretin as provided by the blood. That is to say, any medium having the same power, similar quality, or chemical composition that the blood-stream possesses in combining with secretin to stimulate the pancreas. The addition of such a medium to the active secretin solution increases the potency of the secretin and its degree of stability by preventing oxidation or deterioration thereof. If this strengthening or fortifying medium, as it may be properly termed, is alkaline, it performs the additional function of lowering the acidity of the secretin filtrate. It is preferable that the final product be just faintly acid. If desired, the final product may be made into an elixir by the addition of aromatics.

Any desired strength of secretin solution may be obtained, according to the quantity of animal parts used to a given quantity of acid solution. In my experiments I used from ten to fourteen duodena to a pint of acid solution.

The solution of secretin prepared as above described is characterized by its ability to resist oxidation or deterioration for a sufficient period of time to render the solution available as a commercial article, and is furthermore characterized by freedom from poisonous and irritable chemical substances, whereby the secretin is chemically adapted to the human system to stimulate the pancreas to increased secretion. This increase of pancreatic secretion facilitates the breaking down of the protein and carbohydrate molecule in terminal digestion.

As previously stated, the secretin prepared according to my method may be administered orally to produce the desired physiological action. Of course, if desired, the secretin might be injected intravenously, but this more or less dangerous procedure is not at all necessary, and I merely mention it here to point out that when I refer to the oral administration of my new secretin preparation, I do not mean to exclude its administration by injection.

As to the commercial stability of the secretin prepared according to my method, I may say that I have found by actual tests that the preparation maintains its stability for as long a period as five or six months. When I refer to my product as being "commercially stable," I mean that it resists oxidation or deterioration for a sufficient period to render the same available as a commercial article. This period may vary from several weeks to several months, depending upon certain commercial factors well understood by the manufacturer. So, roughly speaking, I should say that secretin is commercially stable when it retains its activity from one to six months. I do not wish to be understood, however, as limiting myself to these exact figures.

While I have herein described in detail certain forms of procedure in the manufacture of my new product, I would have it understood that my invention is by no means limited to the precise details herein set forth. I believe that I am the first to have solved the problem of producing secretin in fixed and stable form as a commercial article, and the basic idea of my invention may be embodied in other means and methods than those herein specifically set forth by way of illustration.

I would have it understood that the new product of my invention as defined in certain of the appended claims, is independent of and not limited to any particular process of production.

Having thus described my invention what I claim as new and desire to secure by Letters Patent of the United States, is:

1. The process of producing secretin in stable form as a commercial article for therapeutic use, which consists in subjecting the epithelial cells of the intestinal mucosa lining the duodenal tract of a lower animal to the action of an acid solution under heat below the boiling point of the mixture until the mass is thoroughly digested, then filtering said mixture, whereby there is obtained a clear solution containing active secretin which is chemically adapted to the human system, and then adding to the filtrate a substance to aid the activating power of secretin as provided by the blood.

2. The process of producing secretin in stable form as a commercial article for therapeutic use, which consists in subjecting the epithelial cells of the intestinal mucosa lining the duodenal tract of a lower animal to the action of an acid solution under heat below the boiling point of the mixture until the mass is thoroughly digested, then filtering said mixture, whereby there is obtained a clear solution containing active secretin which is chemically adapted to the human system, and then adding to the filtrate a quantity of blood serum to aid the activating power of secretin as provided by the blood.

3. The process of producing secretin in stable form as a commercial article for therapeutic use, which consists in subjecting the epithelial cells of the intestinal mucosa lining the duodenal tract of a lower animal to the action of a 0.1% to 0.8% solution of hydrochloric acid under heat below the boiling point of the mixture until the mass is thoroughly digested, then filtering said mixture, whereby there is obtained a clear solution containing active secretin which is chemically adapted to the human system, and then adding to the filtrate a substance to aid the activating power of secretin as provided by the blood.

4. The process of producing secretin in stable form as a commercial article for therapeutic use, which consists in subjecting the epithelial cells of the intestinal mucosa lining the duodenal tract of a lower animal to the action of 0.1% to 0.8% solution of hydrochloric acid under-heat below the boiling point of the mixture until the mass is thoroughly digested, then filtering said mixture, whereby there is obtained a clear solution containing active secretin which is chemically adapted to the human system, and then adding to the filtrate a quantity of blood serum to aid the activating power of secretin as provided by the blood.

5. As a new article of manufacture, a commercially stable therapeutic compound consisting of secretin and a substance to aid the activating power of secretin as provided by the blood.

6. As a new article of manufacture, a commercially stable therapeutic compound consisting of secretin in an acid solution, and a substance to aid the activating power of secretin as provided by the blood.

7. As a new article of manufacture, a commercially stable therapeutic compound consisting of secretin in an acid solution, and a blood serum to aid the activating power of secretin as provided by the blood.

8. As a new article of manufacture for therapeutic use, a stabilized solution of activated secretin obtained from the duodenal tract of lower animals, which is free from associated cell-tissue and chemically adapted for administration to the human system to produce the physiological effect of stimulating the pancreas.

In witness whereof, I hereunto subscribe my name this 4th day of May, 1914.

JAMES WALLACE BEVERIDGE.

Witnesses:
A. A. THOMAS,
LARELLA F. LITTLE.